Figure 1:
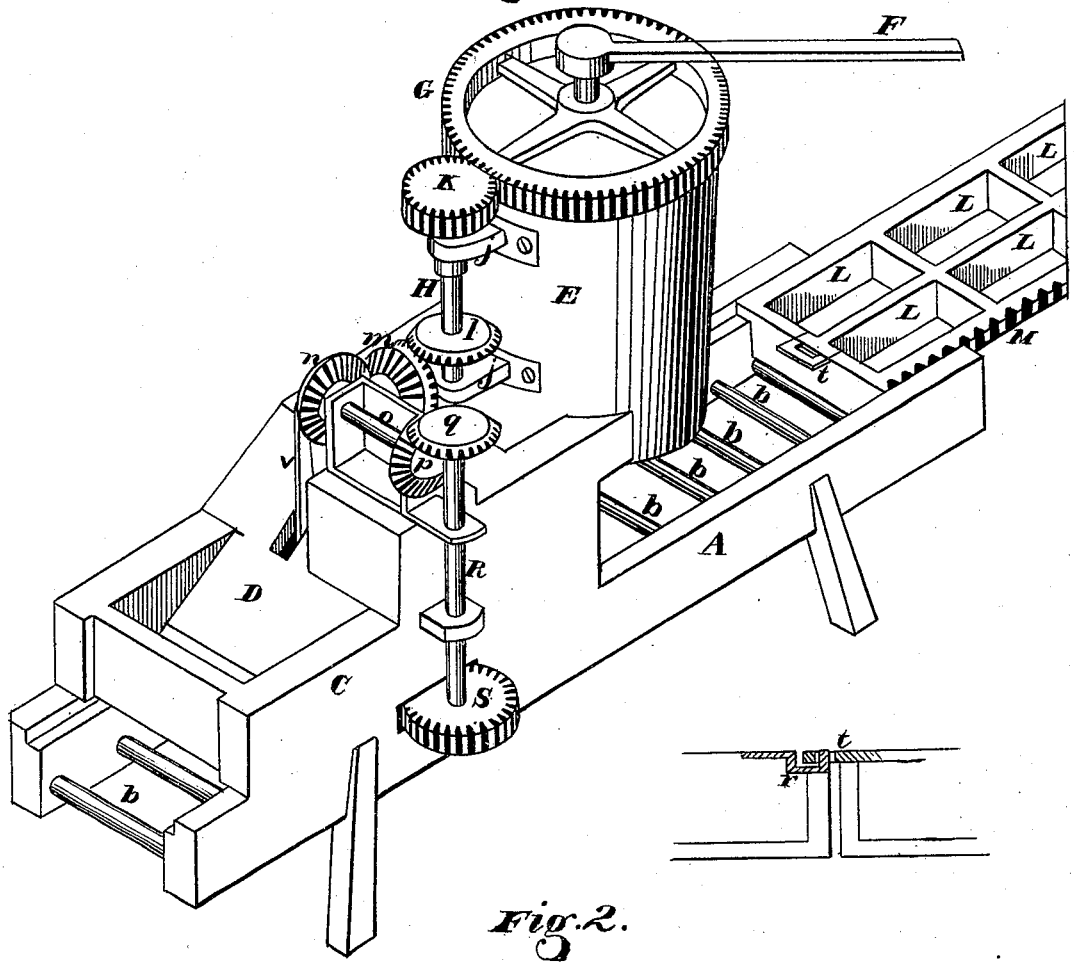
Figure 2:
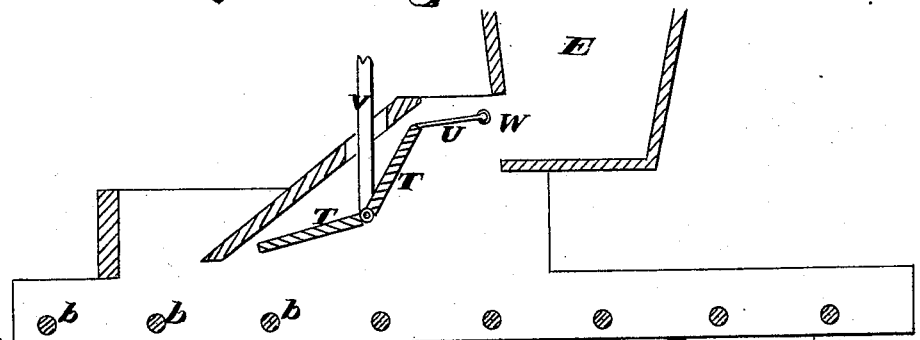

H. SEA.
Brick-Machine.

No. 169,197. Patented Oct. 26, 1875.

Witnesses
Geo. H. Strong.
Jno. L. Boone.

Inventor
Henry Sea
by Dewey & Co.
Attys

UNITED STATES PATENT OFFICE.

HENRY SEA, OF SAN FRANCISCO, CALIFORNIA.

IMPROVEMENT IN BRICK-MACHINES.

Specification forming part of Letters Patent No. 169,197, dated October 26, 1875; application filed September 18, 1875.

*To all whom it may concern:*

Be it known that I, HENRY SEA, of San Francisco city and county, State of California, have invented an Improved Brick-Making Machine; and I do hereby declare the following description and accompanying drawings are sufficient to enable any person skilled in the art or science to which it most nearly appertains to make and use my said invention or improvement without further invention or experiment.

My invention relates to an improved machine for making bricks; and it consists in providing an arrangement by which the molds are automatically passed through the machine, and during their passage are filled, pressed, and struck, so as to deliver the filled molds at the opposite end of the machine.

The pug-mill is so connected with the machine that it delivers the mud or clay directly into the machine, while the presser is operated by the same power that drives the mill, the whole forming a single complete machine for doing the work without any preliminary handling.

Referring to the drawings, A is a frame, which I have represented in the present instance as being mounted upon legs; but in practice it will be placed in a trench or excavation dug for the purpose in the ground, where it will be supported in any convenient manner. At short intervals apart rollers *b b b* are placed transversely across the frame, their ends bearing in the opposite sides of the frame, so that the series of rollers will form a track, upon which the molds will travel when passing through the machine. Upon one end of the frame or table A I secure a bottomless box, C, across which an inclined partition, D, extends, and upon the front end of this box, over the frame A, I mount the pug-mill E, which will be operated by horse-power applied to the end of the sweep F in the ordinary manner of operating pug-mills. Upon the upright shaft of the pug-mill I secure a horizontal driving or master wheel, G, just above the top of the mill, so that it will be rotated by the same power that drives the mill. An upright shaft, H, is supported upon the side of the pug-mill by legs *i j*, which are secured to the rear side of the mill, and on the upper end of this shaft is a toothed wheel, K, which engages with the master-wheel G. On this same shaft, near its lower end, is secured a bevel-wheel, *l*, which engages with one side of a two-faced bevel-gear, *m*. The opposite face of this two-faced bevel-gear engages with a bevel-gear, *n*, on one end of a horizontal shaft, *o*, which is supported on standards above the inclined partition D. A bevel-gear, *p*, on the opposite end of the horizontal shaft *o* engages with a bevel-gear, *q*, which is secured to the upper end of a vertical shaft, R, said shaft being supported by projecting lugs on the side of the box C. To the lower end of the vertical shaft R a horizontal spur-wheel, S, is secured, so that a portion of it will extend through a slot in the side of the frame A. The presser consists of two plates, T T', which are hinged together. These presser-plates are placed inside of the box C, underneath the inclined partition D. The lower plate, T, has a pin in each of its lower corners, which enters a hole in the sides of the box, while the plate stands at an angle of about ten degrees to the track upon which the molds travel, while the other plate, T', stands at an angle of about forty-five degrees to the track, and has its upper corners supported by links *u u* from the sides of the box. A pitman, V, which passes down through the inclined partition, has its upper end attached eccentrically to the bevel-wheel *n*, while its lower end is connected with the hinged plates at their junction, so that the rotation of the wheel will cause the hinged edges of the two plates to rise and lower, thus causing the lower plate to serve as a presser, while the upper plate serves to crowd the mud or clay down toward the passing molds. The mud or clay is introduced into the upper end of the pug-mill through the spaces between the arms of the master-wheel, and is properly mixed and ground, in the usual way. The opening W, through which the ground mud issues from the lower end of the mill, is made on the side of the mill next to the inclined partition, so that the mud will drop down into the molds below. The molds L are constructed in the usual manner, and are just wide enough to pass between the sides of the frame A. Each mold has a rack, M, secured to one of its sides, the teeth of which correspond with the teeth of the horizontal spur-wheel S. Each mold has a hook, r, secured to the middle of one end, and a plate, t, in which is formed an eye at the opposite end, so that they can all be hooked together, as represented.

In commencing operations a mold will be placed upon the rollers or track b b b, and pushed under the mill until the teeth of their racks M are engaged by the teeth of the wheel S. Another mold is then hooked onto its end. The molds will then be automatically drawn through the machine by the spur-wheel S as fast as they are hooked to each other, and as they pass through the mud-chamber in front of the presser-plates T the action of the presser-plates will fill them and press the mud closely into them. The molds will then pass under the lower end of the inclined partition, which will serve as a striker to remove the surplus mud. As the molds pass out at the opposite end of the machine they are removed by the workmen and carried to the yard. The frame A, as above mentioned, will be placed in a trench or excavation in the ground, which is of sufficient depth to permit the horse which operates the sweep to travel on a level surface. The filled molds will then have to be carried up a slight incline in order to deposit the molded adobes on the yard.

It will thus be seen that I combine in one machine a pug-mill and a brick-making machine, and operate the whole from the same power, thus saving much handling of material, and performing the work in an easy and effective manner.

Having thus described my invention, what I claim, and desire to secure by Letters Patent, is—

1. A brick-making machine consisting of the frame A, with its track b b b, box C, with its inclined partition or striker D, hinged pressing-plates T T', and pug-mill E, in combination with the trays or molds L, with their hooks r, eye-plates t, and racks M, when the same power which operates the pug-mill is employed to propel the trays or molds through the machine and operate the presser-plates, all combined and arranged to operate substantially as above described.

2. The trays or brick-molds L, having a hook, r, at one end, and an eye-plate, t, at their opposite end, so that they can be hooked together, each of said molds having the rack M secured to one side, in combination with a track, b b b, and horizontal spur-wheel S, substantially as and for the purpose described.

3. In combination with a brick-making machine having the pug-mill E mounted above it, so as to feed the mud or clay into a chamber of the machine, the hinged presser-plates T T', mounted and operated substantially as and for the purpose described.

HENRY SEA.

Witnesses:
JNO. L. BOONE,
C. M. RICHARDSON.